United States Patent [19]

Pfizenmaier et al.

[11] Patent Number: 4,717,607
[45] Date of Patent: Jan. 5, 1988

[54] METHOD OF MAKING A FLUORESCENT LAMP

[75] Inventors: Paul A. Pfizenmaier, Littleton; Richard C. Marlor, Beverly, both of Mass.

[73] Assignee: GTE Products Corporation, Danvers, Mass.

[21] Appl. No.: 24,733

[22] Filed: Mar. 11, 1987

[51] Int. Cl.$^4$ .............................. C03B 15/14
[52] U.S. Cl. ..................... 428/35; 65/30.1; 65/60.3; 65/86; 65/126; 313/485; 427/237
[58] Field of Search ............ 65/30.1, 31, 60.3, 86, 65/126, 130; 313/485; 65/192; 427/237; 428/35

[56] References Cited

U.S. PATENT DOCUMENTS

| | | | |
|---|---|---|---|
| 1,219,709 | 3/1917 | Danner . | |
| 2,009,793 | 7/1935 | Sanchez-Vello . | |
| 3,035,371 | 5/1962 | Mouly et al. . | |
| 3,498,819 | 3/1970 | Lyle et al. ............... | 65/30.1 X |
| 3,833,399 | 9/1974 | Martyn et al. .......... | 65/30.1 X |
| 4,175,941 | 11/1979 | Lagos et al. ........... | 65/86 X |
| 4,228,206 | 10/1980 | Fabisak ................... | 428/35 |

FOREIGN PATENT DOCUMENTS 0146187 6/1985 European Pat. Off. .
0146188 6/1985 European Pat. Off. .

OTHER PUBLICATIONS

Fluorine Treatments of Soda-Lime Silicate Glass Surfaces Comm. of the Amer. Cera. Soc. Brow et al., 8/1983, pp. C123, 124.
Ball I.T. TM Operation Manual Ball Metal Decorating & Serv. Div. 86-1-143, Box 5000, 1509 So. Macedonia Av., Muncie, Indiana 47302, 4/15/1980.

Primary Examiner—Robert L. Lindsay
Attorney, Agent, or Firm—Carlo S. Bessone

[57] ABSTRACT

A method of making fluorescent lamps having increased brightness and improved maintenance by changing the surface chemistry of the inside surface of the glass tubing while the tubing is being manufactured. While the glass tubing is being drawn from a melt through a bag stage, a predetermined mixture of an organo-fluoride gas and an oxidizing gas is dispensed into the glass bag. The gas mixture is continuously combusted to produce an amount of fluoride gas sufficient to react with alkali ions and alkaline earth ions on the inner surface of the hot glass at the bag stage to form alkali and alkaline earth compounds which are exhausted out through the tubing. Preferably, the organo-fluoride gas is 1,1 difluoroethane.

10 Claims, 2 Drawing Figures

METHOD OF MAKING A FLUORESCENT LAMP

TECHNICAL FIELD

The invention relates to fluorescent lamps. More particularly, this invention is concerned with a method of making fluorescent lamps having increased brightness and improved maintenance.

BACKGROUND OF THE INVENTION

Fluorescent lamps are low-pressure mercury arc discharge devices which have electrodes at each end of an elongated glass envelope and which contain a phosphor coating on the inner surface of the glass envelope. Such lamps experience a gradual decrease in light output with increasing hours of use. A variety of factors contribute to the drop-off in light output during lamp operation. These factors include deposits of impurities from the cathode; the formation of various mercury compounds due to the bombardment of the phosphor by atoms and ions of mercury; changes in the phosphor itself; and changes in the glass envelope, particularly where it may be subject to ultraviolet radiation. The ability of such lamps to resist the drop-off in light output is generally termed lumen maintenance which is measured as the ratio of light output at a given life span compared to an initial light output and expressed as a percentage.

While the decrease in light output with time is an occurrence for all fluorescent lamps, it presents a greater problem for high output and very high output lamps than for normally loaded lamps.

The art and artisans of lamp design have expanded much time and money in an effort to solve these problems. Although the problem of lumen maintenance still exists, it has been alleviated to some extent. Some of the solutions proposed involve changing the inner surface chemistry or the composition of the glass tubing used for the lamp envelope.

U.S. Pat. No. 4,228,206, which issued to Fabisak on Oct. 14, 1980, discloses a method of changing the surface chemistry of the inner surface of the glass tubing by reducing the alkali content thereon. The method involves processing the glass tubing by reacting an acidic gas with the softened glass surface of the tubing as it is being drawn from a glass melt. However, because of the corrosive nature of the reacting gas, the components of the apparatus employed must be acid-resistant.

European Patent Application Nos. 0146187 and 0146188 disclose various glass compositions which resist both phosphor poisoning and mercury penetration. The phosphor poisoning is controlled by restricting the mobility of sodium ions or by incorporating little or no $Na_2O$ in the glass. Mercury penetration is controlled by the presence of a large quantity of alkaline earth metal oxides in the glass. Although the glass compositions disclosed provide satisfactory results, the glass compositions are more expensive than standard soda lime glass. Also, manufacture of the glass compositions taught requires changing the ingredients in the glass melt.

DISCLOSURE OF THE INVENTION

One object of the present invention, therefore, is to obviate the disadvantages of the prior art.

Another object of the present invention is to enhance the operation of fluorescent lamps.

A further object of the present invention is to provide an improved method of making fluorescent lamps having increased brightness and improved maintenance thereof.

Still another object of the present invention is to change the surface chemistry of the inside surface of glass tubing while the tubing is being manufactured without using a corrosive gas.

A further object of the present invention is to change the surface chemistry of the inside surface of glass tubing without changing the ingredients in the glass melt.

In accordance with one aspect of the invention, there is provided an improved method of making fluorescent lamps having increased brightness and improved maintenance thereof. The method includes the step of drawing hot glass from a melt through a bag stage and into the shape of tubing. The temperature of the hot glass at the bag stage is within the working range of the glass. Preferably, the temperature of the hot glass at the bag stage is between about 625° and 1245° C. A predetermined mixture of an organo-fluoride gas and an oxidizing gas is dispensed into the hot bag. The predetermined mixture of the organo-fluoride gas and the oxidizing gas is continuously combusted within the hot bag to produce an amount of fluoride gas sufficient to react with alkali ions and alkaline earth ions on the inner surface of the hot glass at the bag stage to form alkali and alkaline earth compounds. The tubing is cooled and cut into predetermined lengths and coated with phosphor. Finally, the phosphor coated lengths of tubing are formed into fluorescent lamps.

In accordance with teachings of the present invention, the organo-fluoride gas is 1, 1 difluoroethane gas and the oxidizing gas is air. Preferably, the ratio of the oxidizing air to the 1,1 difluoroethane gas is within the range of from about 0.35:1 to about 4.7:1.

In accordance with further teachings of the present invention, the combustion within the hot bag produces a flame extending about 12.0 to 18.0 inches longitudinally past the end of the delivery tube from which the predetermined mixture is delivered.

In accordance with further aspects of the present invention, the method includes the step of blending the predetermined mixture in a chamber before dispensing into the hot bag.

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
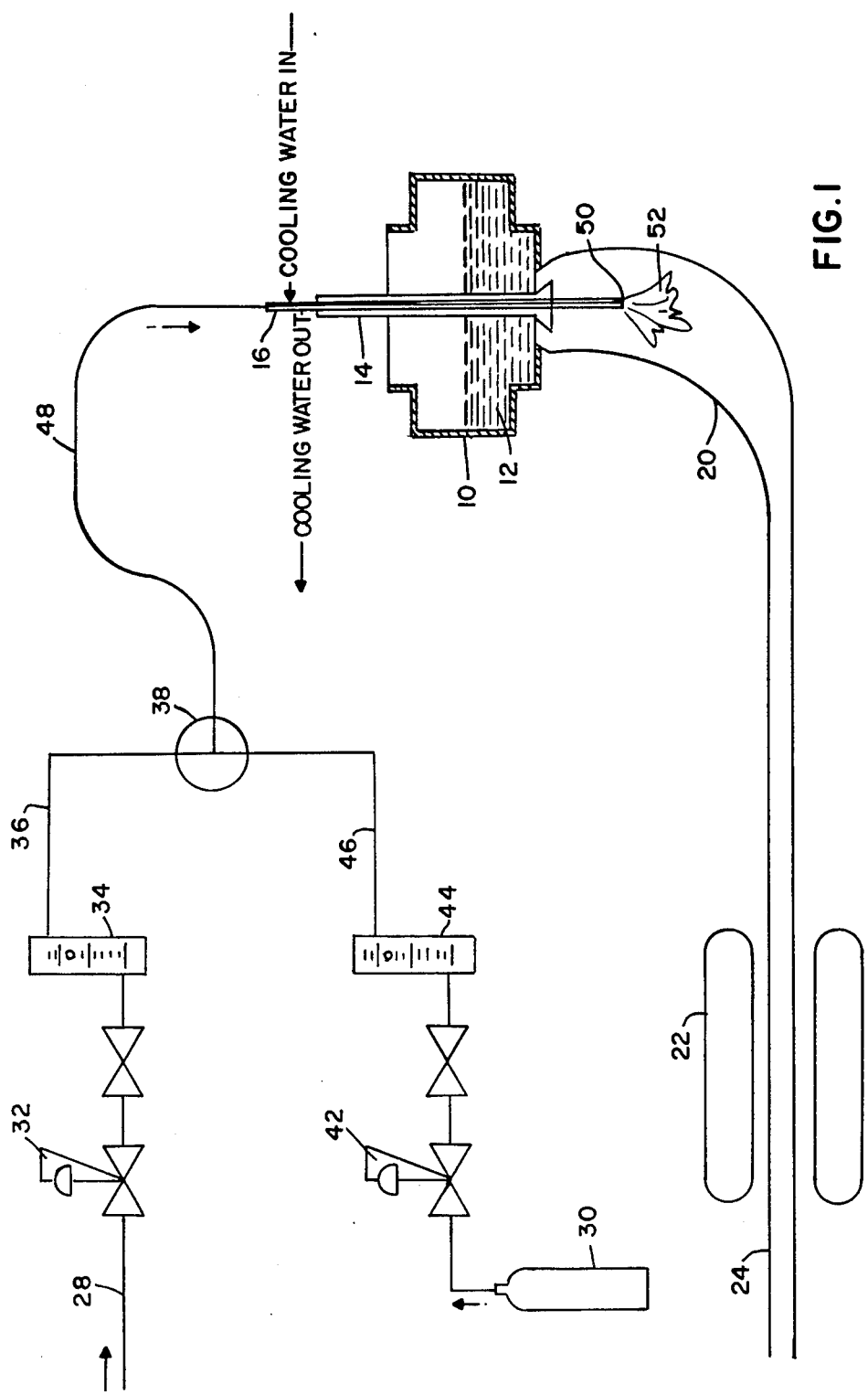
FIG. 1 is a diagrammatic representation of the apparatus that can be used to practice the teachings of the present invention.

With particular attention to FIG. 1, there is shown a diagrammatic representation of the apparatus that can be used to practice the teachings of the present invention. As shown in FIG. 1, a tank 10 contains molten glass 12 which is drawn down around mandrel 14 to form a bag 20 of softened glass which is drawn by tractor 22 to form tubing 24. An oxidizing gas such as oxygen or air, is supplied to line 28. The oxidizing gas is fed through a pressure regulator 32, a flowmeter-valve 34, and line 36 to a chamber 38. A cylinder 30 containing an organo-fluoride gas is fed through a pressure regulator 42, a flowmeter-valve 44, and line 46 to chamber 38. The proper blending of the oxidizing agent and the organo-fluoride gas is achieved in chamber 38. The blended gas mixture from chamber 38 is supplied at a controlled pressure and flow rate through line 48 and a delivery tube 16 which extends through mandrel 14. Delivery tube 16 is made of high nickel alloys, or other materials that can withstand temperatures above 800° C. Delivery tube 16 is continuously water cooled in order to prevent reaction of the gas mixture therewithin.

The diameter of the glass tubing is a function of several variables, for example, the viscosity of the molten glass, speed of draw, orifice size, depth of the glass in the tank, temperature, moisture content and motion of the atmosphere, and the differential between the pressure maintained inside and outside the tubing while it is soft enough to be formable. Uniformity in the dimensions of the tubing is controlled by supplying low pressure (e.g., 0.2 to 10.0 inches of water) blowing air to the interior of the tubing through a hollow cavity between mandrel 14 and delivery tube 16.

In accordance with the teachings of the present invention, the organo-fluoride gas can be, for example, 1,1 difluoroethane. A suitable source of the 1,1 difluoroethane gas (DFE) is Ball Packaging Products, Inc., 1509 South Macedonia Avenue, Muncie, Ind. 47302. This gas is used in the Ball Internal Treatment (Trademark) process for increasing the chemical durability of the interior surface of soda lime glass containers used to hold distilled spirits or drugs.

The temperature of the hot glass at the bag stage is within the working range of the glass. The working range of glass is known to mean the temperature range beween the softening point ($10^{7.6}$ poise) and the working point ($10^4$ poise) of the particular glass. The following TABLE I shows the annealing temperature, softening temperature, and working temperature of various types of glasses which can be used in the present invention.

TABLE I

| Glass Type | Annealing Temperature (°C.) | Softening Temperature (°C.) | Working Temperature (°C.) |
|---|---|---|---|
| lead | 435 | 625 | 980 |
| soda-lime | 510 | 700 | 1005 |
| borosilicate | 565 | 820 | 1245 |

As the glass is in the bag stage at a temperature within the working range, the blended gas mixture is preferably dispensed therein from the end 50 of delivery tube 16. The mixture of the organo-fluoride gas and the oxidizing gas is continuously combusted producing flame 52. The combustion within hot bag 20 produces a fluoride gas which reacts with the available alkali ions and alkaline earth ions such as sodium, potassium, calcium and magnesium on the inner surface of the hot glass to form alkali and alkaline earth compounds such as sodium fluoride, potassium fluoride, calcium fluoride and magnesium fluoride. The resulting alkali and akaline earth compounds do not condense on the glass but are exhausted down the tubing as a result of positive pressure within the tubing. The proportions of the organo-fluoride gas and the oxidizing gas are adjusted to provide a flame 52 extending about 12.0 to 18.0 inches longitudinally past end 50 of delivery tube 16.

The amount of the fluoride gas available is dependent not only on the ratio of the oxidizing gas to the fluorine-containing substance but also on the flow rate of the mixture. The ratio of the oxidizing air to the 1,1 difluoroethane gas can be within the range of from about 0.35:1 to about 4.7:1. Significant results were obtained when the flow rate of the 1,1 difluoroethane gas is about 3.2 to 5.8 cubic feet per hour and the flow rate of the air is about 2.0 to 15.0 cubic feet per hour. After tubing 24 is cooled, the tubing is cut into the required lengths. The cut lengths of tubing can be washed, if desired, before phosphor coating the inner surface of the lengths of tubing. The phosphor coated tubing is then processed into a finished lamp according to known techniques.

As used herein, the term "fluorescent lamp" refers to any lamp containing a phosphor excited to fluorescence by ultra-violet radiation regardless of configuration.

Figure 2:
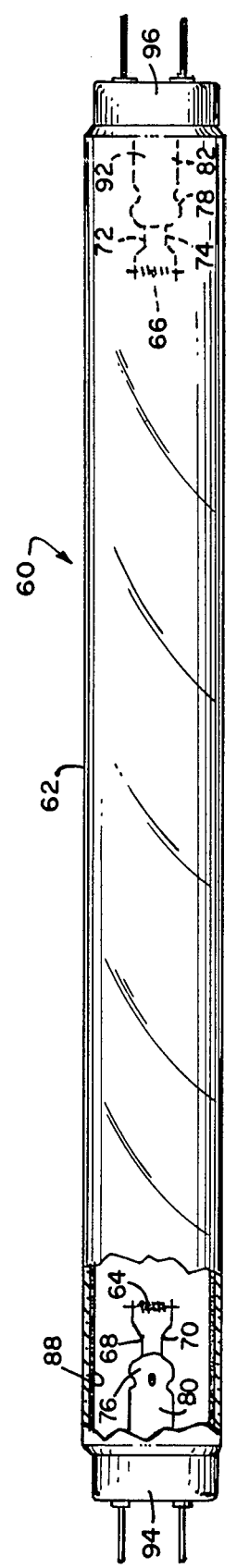
FIG. 2 is an elevational view of a fluorescent lamp partially in section, made in accordance with the teachings of the present invention.

Referring now to the drawing of FIG. 2 with greater particularity, there is shown a fluorescent lamp 60 comprising a tubular, hermetically sealed, glass envelope 62 formed from tubing made in accordance with the teachings of the present invention. Envelope 62 can be, for example, lead, soda-lime or borosilicate. Electrodes 64 and 66 are sealed in the ends of envelope 62 and supported by lead-in wires 68, 70 and 72, 74 respectively, which extend through glass presses 76, 78 in mount stems 80, 82. Lead-in wires 68, 70 and 72, 74 contact suitable terminals or pins in respective bases 94 and 96 affixed to the ends of lamp 60.

The sealed tube is filled with an inert gas such as argon, zenon, krypton, neon, helium and combinations with mercury at a low pressure such as 2 to 5 torr. The inner surface of the tubing 62 is coated with a layer of phosphor 88, for example, Cool White.

A number of different fluorescent lamp types were evaluated with various ratios of air to 1,1 difluoroethane gas and compared with control lamps. Control lamps in each case were fabricated in a manner similar to test lamps except during processing of the tubing when the flow of gases (i.e., oxidizing and organo-fluoride) through delivery tube 16 was eliminated. The results of the evaluation are summarized in the following six Tables. In all of these Tables, the lumen maintenance is calculated as the ratio of light output at the ending hour relative to the light output at 100 hours. The comparisons have been made on the basis of the 100 hour starting point because of the usual rapid drop-off during initial operations which would distort the maintenance figures.

The tests were run by photometering the lamps for light output (lumens) in a standard photometric sphere, both initially and at the stated times.

The objective of the test reported in TABLES IIa and IIb was to determine the effect of various gas mixture flow rates on the lumen maintenance and light output on F40T12 Cool White fluorescent lamps made in accordance with the teachings of the present invention. The lamps had an overall length of approximately 47.78 inches (121.4 centimeters), a bulb diameter of approximately 1.5 inches (3.81 centimeters) and a wall thickness of approximately 0.032 inch (0.81 millimeters).

TABLE IIa

| FLOW RATE (CFH) | | LUMEN MAINTENANCE (%) | | | | |
|---|---|---|---|---|---|---|
| AIR | DFE | 500 HOURS | 1000 HOURS | 1750 HOURS | 3000 HOURS | 5000 HOURS |
| 8.0 | 3.2 | 96.6 | 94.2 | 93.1 | 90.5 | 88.5 |
| 3.0 | 3.8 | 96.5 | 94.4 | 93.8 | 91.4 | 89.4 |
| 2.0 | 4.0 | 96.4 | 94.3 | 93.7 | 91.4 | 88.9 |
| 0 | 0 | 96.3 | 93.7 | 92.8 | 90.0 | 87.0 |

TABLE IIb

LAMP TYPE: F40T12 COOL WHITE

| FLOW RATE (CFH) | | LUMENS | | | | | |
|---|---|---|---|---|---|---|---|
| AIR | DFE | 0 HRS. | 100 HRS. | 500 HRS. | 1000 HRS | 1750 HRS | 3000 HRS | 5000 HRS |
| 8.0 | 3.2 | 3207 | 3103 | 2997 | 2922 | 2888 | 2808 | 2747 |
| 3.0 | 3.8 | 3229 | 3084 | 2977 | 2913 | 2894 | 2820 | 2758 |
| 2.0 | 4.0 | 3213 | 3073 | 2962 | 2899 | 2878 | 2809 | 2731 |
| 0 | 0 | 3217 | 3080 | 2967 | 2885 | 2858 | 2771 | 2680 |

As illustrated in TABLE IIa, the average lumen maintenance in the three test groups was higher at each reading shown, when compared to the control group which was processed without using an organo-fluoride gas. In addition, at 5000 hours the test group processed with an air flow rate of 0.3 CFH and a 1,1 difluoroethane flow rate of 3.8 CFH showed the highest lumen maintenance among the three test groups. In TABLE IIb, the average light output readings recorded for the same lamps as in TABLE IIa show that the light output in all of the test groups was higher than the control group beginning at the 1000 hour reading. The test group processed with an air flow rate of 3.0 CFH and a 1,1 difluoroethane flow rate of 3.8 CFH showed a higher light output when compared to the control group at each reading shown from 0 to 5000 hours.

The objective of the test reported in TABLES IIIa and IIIb was to determine the effect of various gas mixture flow rates on the lumen maintenance and light output on F48T12 VHO (very high output) Cool White fluorescent lamps made in accordance with present teachings. The lamps had an overall length of approximately 45.72 inches (116.1 centimeters), a bulb diameter of approximately 1.5 inches (3.81 centimeters) and a wall thickness of approximately 0.032 inch (0.81 millimeters).

TABLE IIIa

| FLOW RATE (CFH) | | LUMEN MAINTENANCE | | | |
|---|---|---|---|---|---|
| AIR | DFE | 500 HOURS | 1000 HOURS | 1750 HOURS | 3000 HOURS |
| 8.0 | 3.2 | 89.9 | 84.9 | 78.0 | 73.9 |
| 8.0 | 3.8 | 89.2 | 85.2 | 78.8 | 74.3 |
| 8.0 | 4.0 | 89.5 | 85.1 | 78.0 | 74.3 |
| 0 | 0 | 88.6 | 83.9 | 73.9 | 71.8 |

TABLE IIIb

LAMP TYPE: F40T12 COOL WHITE

| FLOW RATE (CFH) | | LUMENS | | | | | |
|---|---|---|---|---|---|---|---|
| AIR | DFE | 0 HRS. | 100 HRS. | 500 HRS. | 1000 HRS | 1750 HRS | 3000 HRS |
| 8.0 | 3.2 | 7594 | 7033 | 6320 | 5972 | 5488 | 5202 |
| 8.0 | 3.8 | 7608 | 6975 | 6220 | 5943 | 5498 | 5182 |
| 8.0 | 4.0 | 7578 | 7023 | 6284 | 5973 | 5476 | 5222 |
| 0 | 0 | 7520 | 7070 | 6264 | 5934 | 5227 | 5080 |

As illustrated in TABLE IIIa, the average lumen maintenance in the three test groups was higher at each reading shown, when compared to the control group which was processed without using an organo-fluoride gas. In TABLE IIIb, the average light output readings recorded for the same lamps as in TABLE IIIa, show that the average light output in all of the test groups was higher than the control groups initially and again at the 1000, 1750 and 3000 hour readings.

The objective of the test reported in TABLES IVa and IVb was to determine the effect of a flow rate ratio of 8.0 to 3.2 conducted during a continuous 4 hour test run. Samples of the tubing from the test run was taken at various times during the run and processed into F48T12 VHO (very high output) Cool White lamps. The lamps had an overall length of approximately 45.72 inches (116.1 centimeters), a bulb diameter of approximately 1.5 inches (3.81 centimeters) and a wall thickness of approximately 0.032 inch (0.81 millimeters).

TABLE IVa

LAMP TYPE: F48T12 VHO COOL WHITE

| PROD. HOUR | FLOW RATE (CFH) | | LUMEN MAINTENANCE (%) | | |
|---|---|---|---|---|---|
| | AIR | DFE | 500 HOURS | 1000 HOURS | 1750 HOURS |
| 1-2 | 8.0 | 3.2 | 97.7 | 96.6 | 94.4 |
| 2-3 | 8.0 | 3.2 | 97.7 | 96.1 | 94.6 |
| 3-4 | 8.0 | 3.2 | 97.9 | 97.2 | 94.4 |
| | 0 | 0 | 97.4 | 96.1 | 93.1 |

TABLE IVb

LAMP TYPE: F48T12 VHO COOL WHITE

| PROD. HOUR | FLOW RATE (CFH) | | LUMENS | | | | |
|---|---|---|---|---|---|---|---|
| | AIR | DFE | 0 HOURS | 100 HOURS | 500 HOURS | 1000 HOURS | 1750 HOURS |
| 1-2 | 8.0 | 3.2 | 3188 | 3092 | 3023 | 2987 | 2920 |

TABLE IVb-continued

| | LAMP TYPE: F48T12 VHO COOL WHITE | | | | | | |
|---|---|---|---|---|---|---|---|
| PROD. | FLOW RATE (CFH) | | LUMENS | | | | |
| | | | 0 | 100 | 500 | 1000 | 1750 |
| HOUR | AIR | DFE | HOURS | HOURS | HOURS | HOURS | HOURS |
| 2-3 | 8.0 | 3.2 | 3181 | 3088 | 3011 | 2968 | 2920 |
| 3-4 | 8.0 | 3.2 | 3210 | 3072 | 3007 | 2985 | 2900 |
| | 0 | 0 | 3206 | 3055 | 2977 | 2936 | 2846 |

As shown in TABLE IVa, the average lumen maintenance on all samples taken during the four hour test run was higher (or equal in one instance) in each reading when compared to the control group which was processed without using an organo-fluoride gas. In addition, the average light output on all samples taken during the four hour test run was higher at each reading shown in TABLE IVb beginning at the 100 hour reading when compared to the control group.

There has thus been shown and described a method of making fluorescent lamps having increased brightness and improved lumen maintenance. The method taught can change the surface chemistry of the inside surface of the glass tubing while the tubing is being manufactured without using a corrosive gas. Also the present method can be employed without changing the ingredients in the glass melt. The inner surface of glass tubing made in accordance with the present teachings have a lower concentration of alkali ions than untreated tubing. In addition, a secondary ion mass spectrometer (SIMS) analysis shows a depletion of alkaline earth ions to a depth of about 2000 angstroms and a fluoride enrichment to a depth of over 1 micron.

While there have been shown and described what are at present considered to be the preferred embodiments of the invention, it will be apparent to those skilled in the art that various changes and modifications can be made herein without departing from the scope of the invention as defined by the appended claims. For example, reference has been made to an apparatus that can be used to practice the teachings of the present invention. However, it is possible to apply the teachings to other apparatus such as that described in U.S. Pat. No. 1,219,709 which issued to Danner.

What is claimed is:

1. A method of making fluorescent lamps having increased brightness and improved maintenance thereof comprising the steps of:
   drawing hot glass from a melt through a bag stage and into the shape of tubing, the temperature of said hot glass at said bag stage being within the working range of said glass;
   dispensing into the hot bag a predetermined mixture of an organo-fluoride gas and an oxidizing agent;
   continuously combusting said predetermined mixture of said organo-fluoride gas and said oxidizing gas within said hot bag to produce an amount of fluoride gas sufficient to react with alkali ions and alkaline earth ions on the inner surface of said hot glass at said bag stage to form alkali and alkaline earth compounds;
   cooling and cutting said tubing into predetermined lengths;
   coating said predetermined lengths with phosphor; and
   forming said coated predetermined lengths into fluoroescent lamps.

2. The method of claim 1 wherein said temperature of said hot glass at said bag stage is between about 625° and 1245° C.

3. The method of claim 1 wherein said organo-fluoride gas is 1,1 difluoroethane gas.

4. The method of claim 3 wherein said oxidizing gas is air.

5. The method of claim 4 wherein the ratio of said air to said 1,1 difluoroethane gas is within the range of from about 0.35:1 to about 4.7:1.

6. The method of claim 3 wherein said predetermined mixture is delivered through a delivery tube and the combustion within said hot bag producing a flame extending about 12 to 18 inches longitudinally past the end of said delivery tube.

7. The method of claim 1 including the step of blending said predetermined mixture in a chamber before dispensing into said hot bag.

8. The method of claim 1 including the step of washing the cut lengths.

9. The method of claim 8 including the step of phosphor coating the inner surface of the washed lengths of tubing.

10. A fluorescent lamp made by the method of claim 1.

* * * * *